United States Patent Office 3,178,394
Patented Apr. 13, 1965

3,178,394
COMPOSITION COMPRISING ACRYLAMIDE-STYRENE-FORMALDEHYDE REACTION PRODUCT WITH AN ORGANIC DIISOCYANATE
Roger M. Christenson, Gibsonia, Pa., assignor to Pittsburgh Plate Glass Company, Pittsburgh, Pa., a corporation of Pennsylvania
No Drawing. Filed Jan. 24, 1961, Ser. No. 84,498
14 Claims. (Cl. 260—77.5)

This invention relates to new and useful resinous compositions and more particularly it relates to blends of (1) unsaturated carboxylic acid amide interpolymers and (2) a material selected from the group consisting of a diisocyanate and a reaction product of a diisocyanate with a compound having active hydrogen atoms.

This application is a continuation-in-part of copending application Serial No. 749,583, filed July 21, 1958, now U.S. Patent No. 3,037,963, which is a continuation-in-part of abandoned application Serial No. 584,473, filed May 14, 1956, which in turn is a continuation-in-part of abandoned application Serial No. 490,409, filed February 24, 1955. In that application there is disclosed the preparation of a substantially water insoluble interpolymer containing from about 2 percent to 50 percent by weight of an unsaturated carboxylic acid amide and from about 50 percent to about 98 percent of at least one other monomer containing a single $CH_2=C<$ group in terminal position. This interpolymer has been further reacted with formaldehyde in an alcoholic solution, whereby at least one of the amide hydrogens is substituted by an alkoxyalkyl radical. This application further states in column 11, lines 47 through 49, that these amide interpolymer-aldehyde condensation products can be advantageously reacted with diisocyanates.

The amide interpolymer-aldehyde condensation products which are disclosed and claimed in the above-mentioned application can be used to form coating compositions, laminating compositions, and molding compositions which have excellent chemical and solvent resistance, excellent flexibility and toughness. The coating compositions themselves have very good adhesion and are particularly useful as appliance finishes, automotive primer coats, etc.

The resins prepared in accordance with the method described in said copending application Serial No. 749,-583, are useful in coating compositions, laminates, and the like, particularly when blended with one or more other resinous materials such as epoxide resins, vinyl resins, amine resins, alkyd resins, nitrocellulose, polyethylene, and the like. Such resinous blends form films with excellent flexibility, recoat adhesion, and freedom from undesirable color formation, even on overbaking of the film. These films are also outstanding in appearance, gloss, adhesion, mar resistance, color retention, moisture resistance, stain resistance, grease resistance, heat resistance, detergent resistance, and corrosion resistance. Moreover, these outstanding properties are obtained in a single coating of the resinous coating composition on a metallic surface; whereas previous coating compositions have almost without exception required the use of one or more so-called "primer" coats.

The outstanding properties set forth in the foregoing paragraph render the aldehyde-modified amide interpolymer coating compositions useful as finishes for appliances, such as ranges, refrigerators, air conditioners, washers, water heaters, as well as finishes for steel building panels and aluminum siding, and in fact as general industrial finishes on solid surfaces, such as metals, plastics, wallboard, and the like. Such compositions have met with wide commercial acceptance throughout the world.

However, the aldehyde-modified amide interpolymer resins and blends thereof with other resinous materials possess one disadvantage in that coating compositions prepared therefrom should be cured at temperatures of about 350° F. for a period of 30 minutes in order that the outstanding properties set forth hereinabove for such materials will be obtained to the optimum degree. Many industrial finishing installations do not possess oven facilities which can attain temperatures as high as 350° F., and consequently industries having such installations cannot obtain optimum properties from coating compositions containing the aldehyde-modified amide interpolymer resins.

It has now been found that the amide interpolymer-aldehyde condensation products can be advantageously blended with diisocyanates and certain diisocyanate derivatives which contain reactive isocyanate radicals to form coating compositions which are susceptible to lower curing temperatures. Moreover, these coating compositions are harder and have greater mar resistance than the unmodified interpolymers. It has also been discovered that in many instances through the use of these diisocyanates the need for the aldehyde condensation is eliminated. By adjusting the degree of alkylolation (methylolation) the curing rate can be regulated; the alkylolated carboxylic acid amide interpolymer-diisocyanate blends cure faster than those blends containing the non-alkylolated interpolymers, while the curing rate increases as the degree of alkylolation is increased. Another important advantage obtained with the resinous composition of the instant invention is that they have excellent water resistance even when air dried or cured at low temperatures (below 250° F.).

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relative short chain soluble interpolymer having an approximate structure as follows, acryl-amide being utilized for illustrative purposes:

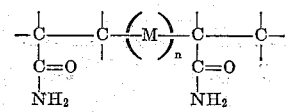

wherein M represents a unit of a monomer polymerizable with acrylamide, and $n$ represents a whole number greater than 1. For example, if styrene were utilized as the second monomer, M would represent the unit:

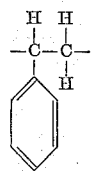

The short chain interpolymer then reacts with an aldehyde, as represented by formaldehyde, to give the structure:

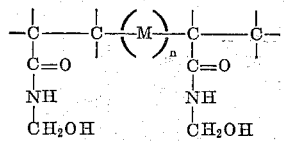

wherein M and $n$ have the significance set forth hereinabove.

In the event the aldehyde is utilized in the form of a solution in butanol or other alkanol, etherification will take place so that at least some of the methylol groups in the above structure will be converted to groups of the structure:

wherein R is selected from the class consisting of hydrogen and a saturated lower aliphatic hydrocarbon radical having its free valences on a single carbon atom, and $R_1$ is a member of the class consisting of hydrogen and the radical derived by removing the hydroxyl group from the alkanol.

The degree of etherification can be used as a control to adjust compatibility with other resins which may be blended therewith and also as a control of stability for storage before incorporating the diisocyanate for air drying and low temperature cure formulations. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol, or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl-propene-1), 2-methyl-propene-1, 2-methyl-butene-1, 2-methyl-pentene-1, 2,3-dimethylbutene-1, 2,3-dimethyl-pentene-1, 2,4-dimethyl-pentene-1, 2,3,3-trimethyl-butene-1, 2-methyl-heptene-1, 2,3 - dimethyl-hexene-1, 2,4 - dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms, such as alpha-chlorostyrene,
alpha-bromostyrene,
2,5-dichlorostyrene,
2,5-dibromostyrene,
3,4-dichlorostyrene,
3,4-difluorostyrene,
ortho-, meta-, and para-fluorostyrenes,
2,6-dichlorostyrene,
2,6-difluorostyrene,
3-fluoro-4-chlorostyrene,
3-chloro-4-fluorostyrene,
2,4,5-trichlorostyrene,
dichloromonofluorostyrenes,
2-chloropropene,
2-chlorobutene,
2-chloropentene,
2-chlorohexene,
2-chloroheptene,
2-bromobutene,
2-bromoheptene,
2-fluorohexene,
2-fluorobutene,
2-iodopropene,
2-iodopentene,
4-bromoheptene,
4-chloroheptene,
4-fluoroheptene,
cis- and trans-1,2-dichloroethylenes,
1,2-dibromoethylene,
1,2-difluoroethylene,
1,2-diiodoethylene,
chloroethylene (vinyl chloride),
1,1-dichloroethylene (vinylidene chloride),
bromoethylene,
fluoroethylene,
iodoethylene,
1,1-dibromoethylene,
1,1-fluoroethylene,
1,1-diiodoethylene,
1,1,2,2-tetrafluoroethylene,
1,1,2,2-tetrachloroethylene,
1-chloro-2,2,2-trifluoroethylene,
chlorobutadiene and other halogenated diolefinic compounds;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate, and similar vinyl halobenozates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylates, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl, caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate; vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalysts, followed by the necessary additions to get 100 percent conversion is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may be in some instances desirable to add only a portion of the catalyst initially, the remainder being added in increments as the polymerization progresses. External cooling of the polymerization mixture or very accurate control of reflux conditions are important in carrying out the polymerization because of the very rapid reaction rate and because the reaction is highly exothermic. Some control of the heat of reaction is obtained by adding the acrylamide to the polymerization mixture incrementally. Good agitation is also desirable.

It is understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films; whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosures of which are incorporated herein by reference.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. Alkaline catalysts, such as sodium hydroxide, potassium hydroxide, hexamethylenetetramine, and other basic amines may be used initially to effect the alkylolation and afterwards conduct the etherification in the presence of the acidic catalyst. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation, as may a portion of the solvent if desired. In fact, when the aldehyde is utilized in the form of a solution in an alkanol such as butanol, it is desirable that therefore substantially all of the butanol be distilled off at the end of the reaction period and replaced by another solvent, such as xylol. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application, Serial No. 749,583, filed July 21, 1958, does not require reaction of the polymer with an aldehyde since the N-alkoxyalkyl amide monomers already contain an

group, wherein R and $R_1$ have the meaning set forth above. Regardless of the method by which the resinous material is obtained, it will contain in the polymer chain recurrent groups of the structure:

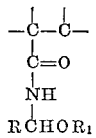

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some of the radical $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

The exact mechanism by which the curing temperature is lowered is not definitely known, but one possible explanation is that these diisocyanates, having a great affinity for amido groups, act as cross-linking agents and thereby aid in the actual curing and become an integral part of the polymer lattice.

The following is a representative unit of a possible structure of a cross-linked aldehyde-modified carboxylic acid amide interpolymer which has been blended with a particular diisocyanate, namely 2,4-chlorophenylene diisocyanate; the urethane linkage set forth therein is the most likely to occur:

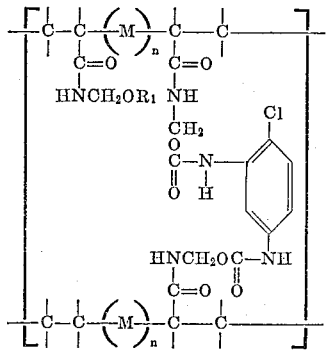

where M and $n$ have the same meaning as before.

If the carboxylic acid amide interpolymer has not been treated with an aldehyde the following urea type linkage is likely to occur when such interpolymer is blended with a diisocyanate:

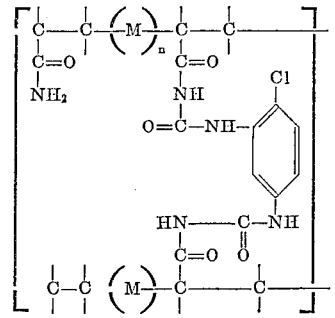

Any of a wide variety of organic diisocyanates may be employed in the reaction, including aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring are preferred. In general they react more rapidly with the carboxylic acid amide interpolymers than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-4-methylphenyl) urea, may also be used. Particularly useful are the modified diisocyanates such as those which have been modified through partial reaction with an alcohol or any other compound having active hydrogen atoms whereby some of the free isocyanate radicals have become "tied up." The so-called "polyisocyanate-formers," that is, compounds that react like polyfunctional isocyanates at elevated temperatures are not to be considered within the scope of the instant invention. The use of such compounds would defeat the purpose of the instant invention since it is clearly an object thereof to prepare the aforementioned carboxylic acid amide interpolymers so that they cure at temperatures lower than those which was heretofore necessary.

The following examples are given to illustrate in detail the preparation of the resins and the resinous blends of the instant invention and are not given by way of limitation. All parts and percentages are by weight unless otherwise specified.

Examples I through VII describe the preparation of carboxylic acid amide interpolymers which may be blended with diisocyanates. In those instances in which an alcohol has been used for the reaction medium it is advantageous to replace the alcohol with a non-hydroxyl substituted solvent before the addition of the diisocyanate so that the hydroxyl value is less than about 50. If this is not done the free isocyanate radicals will be partially "tied up" by the solvent and will not be able to react freely with the interpolymer. Example IX is illustrative of removal of the alcohol.

EXAMPLES I TO IV

These examples illustrate the preparation of aldehyde-modified acrylamide interpolymers which can be advantageously blended with diisocyanates to form the coating compositions of this invention. The polymerization in each example was carried out by mixing the polymerizable components with a chain transfer agent in a solvent such as butanol or xylene, and adding a polymerization catalyst, either initially or in increments throughout the polymerization reaction. The polymerization mixture was then refluxed (in a bomb when butadiene-1,3 is the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Cumene hydroperoxide
C—Alpha-methyl styrene dimers
D—Tertiary dodecyl mercaptan

EXAMPLE VI

In accordance with this example, an interpolymerizable mixture was prepared comprising:

| | Parts by weight |
|---|---|
| Acrylamide | 10 |
| Ethyl acrylate | 65 |
| Styrene | 25 |
| n-Butanol | 50 |
| Solvesso 150 (aromatic hydrocarbon solvent, B.P. 185° C. to 200° C.) | 50 |

The above solution was refluxed at a temperature ranging from about 225° F. to 237° F. for 2 hours in the presence of 1 part cumene hydroperoxide. Five-tenths (0.5) part more cumene hydroperoxide was then added after each of three successive reflux intervals of 2 hours. After the fourth 2 hour reflux interval, 0.5 part cumene hydroperoxide, 21 parts butyl Formcel, 0.3 part maleic anhy-

*Table I*

| | Example I | Example II | Example III | Example IV |
|---|---|---|---|---|
| | 15% Acrylamide, (A) 25% Methyl Methacrylate, (B) 60% Ethyl Acrylate | 20% Acrylamide, (A) 20% Methyl Methacrylate, (B) 60% Ethyl Acrylate | 15% Acrylamide, (A) 25% Styrene, (B) 60% Ethyl Acrylate | 5% Acrylamide, (A) 30% Styrene, (B) 65% Ethyl Acrylate |
| Polymerization charge and procedure: | | | | |
| Acrylamide | 15 | 40 | 15 | 5 |
| Monomer A | 25 | 40 | 25 | 30 |
| Monomer B | 60 | 120 | 60 | 65 |
| Catalyst | 1.0 B | 2 A | 1.0 B / 1.0 A | 3 B |
| Modifier | 1.0 D | 2 C | 1.0 D | |
| Solvent: | | | | |
| n-Isobutanol | 100.0 | 200.0 | 100.0 | 50.0 |
| Xylene | | | | 50 |
| Reflux time (hours) | 4 | 4 | 6 | 8 |
| Polymer Properties: | | | | |
| Percent solids | 52.5 | 51.6 | 51.5 | |
| Viscosity (Gardner-Holdt) | $Z_3$ | $Z_5$-$Z_6$ | Z | |
| Formaldehyde condensate, parts: | | | | |
| Butanol solution of formaldehyde | 31.70 | 84.6 | 31.70 | ¹ 15 |
| Maleic anhydride | 0.4 | 1.0 | 0.4 | 0.2 |
| Reflux time (Hours) | 3 | 3.5 | 3 | |
| Final Product: | | | | |
| Percent solids | 50.1 | 48.95 | 50.6 | 49.3 |
| Viscosity (Gardner-Holdt) | Y | Y | U-V | Z |
| Color (Gardner) | 3-4 | <1 | 3-4 | 1 |

¹ Parts Resin.

EXAMPLE V

In this example an interpolymerizable mixture was prepared comprising:

| | Parts by weight |
|---|---|
| Acrylamide | 90 |
| Methacrylic acid | 15 |
| Ethyl acrylate | 264 |
| Styrene | 231 |
| n-Butanol | 300 |
| Toluene | 300 |

This mixture was refluxed for 2 hours at a temperature between 210° F. and 215° F. in the presence of 9 parts tertiary dodecyl mercaptan and 9 parts cumene hydroperoxide, 3 more parts of cumene hydroperoxide were then added and the mixture was refluxed at the same temperature for another 2 hours, after which was added 3 more parts of cumene hydroperoxide, 190.5 parts of butyl Formcel, and 2.6 parts of maleic anhydride. This mixture was then distilled azeotropically for 2 hours to remove water, after which was added 3 more parts cumene hydroperoxide, the mixture was distilled azeotropically for another 2 hours and 3 more parts cumene hydroperoxide were added, and a final azeotropic distillation is made to a viscosity (Gardner-Holdt) of V-T; and the resulting mixture was then filtered at 175° F. The solids content was 50 percent and the viscosity (Gardner-Holdt) was U to W.

dride were added to the mixture, which was azeotropically distilled for 3 hours to remove the formed water, the mixture was then cooled to 175° F., diatomaceous earth was added and the product was filtered at 175° F., resulting resinous composition had a solids content of about 50 percent and a viscosity (Gardner-Holdt) ranging from Y to Z.

EXAMPLE VII

Another resin was prepared in the same manner as the resin prepared in Example VI, except that the resinous mixture was cooled at 125° F. and combined with 31.1 parts of a 75 percent toluene solution of an epoxy resin (epoxide equivalent 425–525, M.P. 64–76, viscosity C–G, 40 percent solution in butyl Carbitol) and 15.6 parts Solvesso 150 (aromatic solvent, B.P. range 185° C. to 200° C.). The resulting resin had a solids content of about 50 percent and a viscosity (Gardner-Holdt) of W-Y.

EXAMPLE VIII

An interpolymer was prepared per mixture of the following materials:

| | Parts by weight |
|---|---|
| Styrene | 247.5 |
| Methacrylic acid | 7.5 |
| Acrylamide | 45.0 |
| Butanol | 150.0 |
| Toluene | 175.0 |

The above mixture was refluxed for 2 hours in the presence of 3.0 parts cumene hydroperoxide and 3.0 parts tertiary dodecyl mercaptan, then for three more successive 2 hour reflux periods, after each of which was added 1.5 parts cumene hydroperoxide. After the fourth reflux period, 0.55 part cumene hydroperoxide and 50 parts solution of 25 percent toluene and 75 percent epoxy resin (epoxide equivalent 450–525, Epon 1001) were added. This mixture was then refluxed for another hour, cooled at 180° F., the resulting composition had a Gardner-Holdt viscosity of W–X at 50 percent solids.

EXAMPLE IX

| | Parts by weight |
|---|---|
| Acrylamide | 150 |
| Styrene | 375 |
| Ethyl acrylate | 975 |
| Xylene | 750 |
| n-Butanol | 750 |

The above mixture was refluxed in the presence of 15 parts cumene hydroperoxide and 15 parts tertiary dodecyl mercaptan for three 2 hour periods, after each of which was added 7.5 parts cumene hydroperoxide. After the third reflux period, 329 parts butyl Formcel and 4.2 parts maleic anhydride were also added to the mixture. The mixture was then refluxed for 3 hours, after which 850 parts of solvent were distilled from the mixture and substituted by 864 parts high boiling aromatic solvent, boiling point 185° C.–200° C. (Solvesso 150). The resulting resinous product contained 50 percent solids with a viscosity (Gardner-Holdt) of W and a color (Gardner) of 6+. The hydroxyl value was 42.

The following examples illustrate the effect of diisocyanates on the curing temperature of the aforementioned carboxylic acid amide interpolymers.

EXAMPLES X TO XII

| | Parts by Weight | | |
|---|---|---|---|
| | Example X | Example XI | Example XII |
| Product of Example IX | 100 | 100 | 100 |
| Toluene diisocyanatetrimethylol propane reaction product (Mondur CB) | 41 | 83.5 | 83 |
| Xylene | 25 | 38.5 | 25 |
| Cellosolve acetate | | | 8.5 |

The above compositions were sprayed on phosphatized steel panels (Bonderite 1000), bare steel panels and wood (pine) panels, and air dried for 1½ hours. Table II illustrates the physical properties of the above compositions after they have been air dried. The wood panels which had been coated with the above compositions exhibited a hard, clear, varnish-like surface which was comparable to the standard commercial varnishes.

EXAMPLE XIII

| | Parts by weight |
|---|---|
| N-methylol acrylamide | 43.1 |
| N-butoxymethyl acrylamide | 68.2 |
| Styrene | 165.5 |
| Ethyl acrylate | 186.3 |
| Methyl ethyl ketone | 460.0 |

The above ingredients were admixed and charged into a suitable vessel, 4.6 parts of alpha, alpha, azo-di-isobutyronitrile and 9 parts of tertiary dodecyl mercaptan were added to the mixture and refluxed for 2 hours, 2.3 parts more of alpha, alpha, azo-di-isobutyronitrile were added and the mixture was refluxed for three more consecutive 2 hour intervals with 2.3 parts of alpha, alpha, azo-di-isobutyronitrile being added to first two successive intervals. Resultant product was obtained as a solution containing 49.2 percent solids with a viscosity (Gardner-Holdt) of A.

EXAMPLE XIV

| | Parts by weight |
|---|---|
| N-butoxymethyl acrylamide | 110 |
| Styrene | 132 |
| Ethyl acrylate | 148 |
| Methyl ethyl ketone | 390 |

The above ingredients were admixed and charged into a suitable vessel, 3.9 parts of tertiary dodecyl mercaptan and 3.9 parts of alpha, alpha, azo-di-isobutyronitrile were added and the mixture was refluxed for 2 hours, after which was added 2 more parts of alpha, alpha azo-di-isobutyronitrile. Reaction mixture was then refluxed for four more 2 hour intervals. After each of the successive three, 2 parts more of alpha, alpha, azo-di-isobutyronitrile was added to the reaction mass. Resultant product had a solids content of 49.5 percent and a viscosity (Gardner-Holdt) of A–.

EXAMPLE XV

| | Parts by weight |
|---|---|
| N-butoxymethyl acrylamide | 114.6 |
| Styrene | 139.2 |
| Ethyl acrylate | 156.2 |
| Methyl ethyl ketone | 410.0 |

The above ingredients were admixed and charged into a suitable vessel, 4.1 parts of tertiary dodecyl mercaptan and 4.1 parts of alpha, alpha, azo-di-isobutyronitrile were added and the mixture was refluxed for five successive 2 hour intervals. After each of the first three was added 2 parts more of alpha-alpha, azo-di-isobutyronitrile. Resultant product had a total solids content of 50 percent and a viscosity (Gardner-Holdt) of B–.

The following table (Table III) illustrates the improvement in water resistance of the carboxylic acid amide

*Table II*

| Example Number | Pot Life, Hours | Gloss | Initial Sward | Final Sward | Adhesion [1] | | | Film Clarity | Humidity, 500 Hours | Water Soak, 500 Hours | Conical Mandrel Passed |
|---|---|---|---|---|---|---|---|---|---|---|---|
| | | | | | Bonderite | Bare Steel | Wash Primer | | | | |
| X | 192 | 99 | 4 | 26 | Excellent | Good | Good | Good | Excellent on bare steel, wash primer and Bonderite. | Excellent on Bonderite and wash primer. | ⅛″ |
| XI | 144 | 99 | 6 | 32 | do | Fair | do | do | do | Excellent on Bonderite. | ⅛″ |
| XII | 144 | 98 | 16 | 54 | do | Good | do | do | Excellent on Bonderite and aluminum. | Excellent on Bonderite, wash primer and aluminum. | ⅛″ |

[1] Adhesion was tested by cutting a series of parallel lines about ⅛″ apart in the coating and by cutting another series of parallel lines perpendicular to and across the first series. The amount of chipping away from the substrate is a measure of the adhesion.

interpolymers obtained through modification with diisocyanates.

The above compositions were drawn down on glass panels and air dried for 3 hours. The resulting films were hard and mar resistant.

*Table III*

| Resin, parts by weight | Isocyanate, parts by weight | 350° F. bake | | 180° F. bake | | Air dry (3-5 days) | |
|---|---|---|---|---|---|---|---|
| | | Sward | H²O soak¹ | Sward | H²O soak¹ | Sward | H²O soak¹ |
| 22 parts product of Example XIII. | 4.7 parts of toluene diisocyanate-trimethylol propane reaction product (Mondur CB). | 46 | No change | 38 | No change | 36 | No change. |
| Do | | | do | | Slightly white | | White. |
| 22 parts product of Example XIV. | 4.7 parts of toluene diisocyanate-trimethylol propane reaction product (Mondur CB). | 42 | do | 36 | No change | 38 | No change. |
| Do | | | do | | White | | Very white. |
| 22 parts product of Example XV. | 4.7 parts of toluene diisocyanate-trimethylol propane reaction product (Mondur CB). | | do | | No change | | No change. |
| Do | | | do | | Slightly white | | White. |

¹ Water soak, 3 days at 25° C.

The following examples illustrate the use with diisocyanates of carboxylic acid amide interpolymers which have not been aldeyhyde-modified.

EXAMPLE XVI

| | Parts by weight |
|---|---|
| Acrylamide | 36 |
| Isobutyl acrylate | 325 |
| Butyl acetate | 540 |

The above components were refluxed for 8 hours in the presence of 3.6 parts cumene hydroperoxide. The resulting resinous product had the following properties:

| | |
|---|---|
| Total solids (percent) | 39.8 |
| Viscosity (Gardner-Holdt) | 0 |
| Color (Gardner) | 3-4 |

EXAMPLE XVII

| | Parts by weight |
|---|---|
| Acrylamide | 10 |
| Vinyl toluene | 40 |
| Ethyl acrylate | 50 |

The above components were refluxed in a cellosolve acetate for 8 hours. The resulting product contained 39 percent solids.

EXAMPLE XVIII

| | NCO equivalents |
|---|---|
| Product of Example XVI | 1.00 |
| Toluene diisocyanate-hexanetriol reaction product (Descodur TH) | 1.10 |

The above components were drawn down on glass panels and steel panels, and baked for 30 minutes at 300° F. The Sward hardness of the resulting films were as follows:

| | Sward hardness |
|---|---|
| Steel panels | 20 |
| Glass panels | 18 |

The panels had an impact of greater than 48 inch pounds.

EXAMPLES XIX to XXII

| | Parts by weight | | | |
|---|---|---|---|---|
| | Example XIX | Example XX | Example XXI | Example XXII |
| Product of Example XII | 6.5 | 6.5 | 6.5 | 6.5 |
| Toluene diisocyanate-trimethylol propane reaction product (Mondur CB) | 1 | 1.5 | 2 | 2.2 |

EXAMPLE XXIII

| | Parts by weight |
|---|---|
| Acrylamide | 10 |
| Ethyl acrylate | 90 |
| Ethyl acetate | 150 |

The above components were refluxed in the presence of 0.5 part benzoyl peroxide, 0.5 part ditertiary butyl peroxide, and 1.05 parts tertiary dodecyl mercaptan for 8 hours. The resultant resinous product had a solids content of 35.6 percent.

EXAMPLE XXIV

| | Parts by weight |
|---|---|
| Acrylamide | 5 |
| Ethyl acrylate | 95 |
| Ethyl acetate | 150 |

The above components were refluxed in the presence of 0.5 part benzoyl peroxide, 0.5 part ditertiary butyl peroxide, and 1.05 parts tertiary dodecyl mercaptan for 8 hours. The resultant resinous product had a solids content of 39.1 percent.

EXAMPLE XXV

| | Isocyanate equivalents |
|---|---|
| Product of Example XXIII | 1.00 |
| Toluene diisocyanate (Mondur C) | 1.10 |

The above components were mixed and drawn down on steel panels which were air dried for 2 days. The resulting films had a Sward hardness of 18, an impact of 120 inch pounds and good adhesion. Some of the coated glass samples were baked for 30 minutes at 250° F. The baked films did not blush after 48 hours' water soak.

Although specific examples of the invention have been set forth hereinabove, it is not intended that the invention be limited solely thereto, but to include all of the variations and modifications falling within the scope of the appended claims.

I claim:

1. A composition comprising (1) an interpolymer of a polymerizable unsaturated carboxylic acid amide and at least one other monomer containing a CH₂=C< group, said interpolymer being characterized by containing amido groups derived from said amide with an amido hydrogen atom replaced by the structure

wherein R is a member selected from the class consisting of hydrogen and hydrocarbon radicals, and $R_1$ is a member selected from the class consisting of hydrogen and a radical derived by removing the hydroxyl group from a monohydric alcohol, and (2) at least one member selected from the group consisting of an organic diisocyanate and an isocyanato-terminated polyether adduct of an organic diisocyanate with a compound having active hydrogen atoms.

2. A composition comprising (1) an interpolymer of acrylamide and at least one other monomer containing a $CH_2=C<$ group, said interpolymer containing from about 2 percent to about 50 percent by weight of acrylamide in polymerized form based upon the total weight of said interpolymer, and being characterized by containing amido groups derived from said amide with an amido hydrogen atom replaced by the structure $—CH_2OR_1$, wherein $R_1$ is an alkyl radical containing from 1 to 8 carbon atoms, and (2) at least one member selected from the group consisting of an organic diisocyanate and an isocyanato-terminated polyether adduct of an organic diisocyanate with a compound having active hydrogen atoms.

3. A composition comprising a mixture of (1) an interpolymer of acrylamide with at least one other monomer containing a $CH_2=C<$ group, said interpolymer containing from about 2 percent to about 50 percent by weight of acrylamide and being characterized by having at least about 50 percent of the amido groups having a hydrogen atom replaced by the structure $—CH_2OR_1$ wherein $R_1$ is an alkyl radical containing from 1 to 8 carbon atoms, and (2) at least one member selected from the group consisting of an organic diisocyanate and an isocyanato-terminated polyether adduct of an organic diisocyanate with a compound having active hydrogen atoms.

4. The composition of claim 1 wherein the carboxylic acid amide is methacrylamide.

5. The composition of claim 1 wherein the said (2) material is an isocyanato-terminated polyether adduct of a polyol and an arylene diisocyanate.

6. The composition of claim 1 wherein the said (2) material is an arylene diisocyanate.

7. The product of claim 1 wherein the said (2) material is an isocyanato-terminated polyether adduct of a polyol and toluene diisocyanate.

8. The composition of claim 1 wherein the said (2) material is toluene diisocyanate.

9. The product of claim 1 wherein the said (2) material comprises an alkylene diisocyanate.

10. The composition of claim 9 wherein the interpolymer comprises acrylamide and styrene.

11. The composition of claim 9 wherein the interpolymer comprises acrylamide, styrene and ethyl acrylate.

12. The composition of claim 11 wherein the interpolymer contains a member of the class consisting of acrylic acid and methacrylic acid.

13. The composition of claim 3 wherein the interpolymer is an interpolymer comprising acrylamide and styrene.

14. The composition of claim 3 wherein the interpolymer is an interpolymer comprising acrylamide, styrene, ethyl acrylate, and a member of the class consisting of acrylic acid and methacrylic acid.

References Cited by the Examiner

UNITED STATES PATENTS

| | | | |
|---|---|---|---|
| 2,734,004 | 2/56 | Robinson | 260—72 |
| 2,879,251 | 3/59 | Seeger | 260—75 |
| 2,886,557 | 5/59 | Talet | 260—77.5 |
| 2,957,852 | 10/60 | Frankenburg | 260—75 |

FOREIGN PATENTS 576,363  4/46  Great Britain.

LEON J. BERCOVITZ, *Primary Examiner.*

H. N. BURSTEIN, *Examiner.*